United States Patent [19]

Ferraro

[11] Patent Number: 4,649,321

[45] Date of Patent: Mar. 10, 1987

[54] GATE CAPACITANCE LATCH FOR DC TO AC CONVERTERS

[75] Inventor: Angelo Ferraro, Stillwater, N.Y.

[73] Assignee: General Electric Company, Schenectady, N.Y.

[21] Appl. No.: 791,823

[22] Filed: Oct. 28, 1985

[51] Int. Cl.$^4$ ............... H05B 41/29; H02M 7/5387
[52] U.S. Cl. ..................... 315/224; 307/584; 315/DIG. 7; 363/37; 363/132
[58] Field of Search ............ 363/17.37, 98, 131, 363/132; 323/289; 307/571, 583, 584; 315/209 R, 224, DIG. 7

[56] References Cited

U.S. PATENT DOCUMENTS

| | | | |
|---|---|---|---|
| 4,316,243 | 2/1982 | Archer | 363/132 |
| 4,430,586 | 2/1984 | Hebenstreit | 307/584 |
| 4,461,966 | 7/1984 | Hebenstreit | 307/571 |
| 4,485,434 | 11/1984 | Beeston et al. | 363/132 |
| 4,533,986 | 8/1985 | Jones | 363/98 |
| 4,540,893 | 9/1985 | Bloomer | 307/571 |

OTHER PUBLICATIONS

Rheault et al, "Microcomputer Controlled Power MOSFET Transistor Current Source Inverters," IEEE-IAS 1981 Ann. Mtg., Philadelphia, Pa., (5-9, Oct. 1981).

*Primary Examiner*—William H. Beha, Jr.
*Attorney, Agent, or Firm*—Marvin Snyder; James C. Davis, Jr.

[57] ABSTRACT

By driving the gate of a voltage-controlled semiconductor switch, positioned as the upper device in each leg of a DC to AC converter, from an extremely high impedance, the need for floating gate drive power sources is eliminated. The invention takes advantage of the inherent gate capacitance of the switch as an energy storage device.

9 Claims, 5 Drawing Figures

GATE CAPACITANCE LATCH FOR DC TO AC CONVERTERS

BACKGROUND OF THE INVENTION

The present invention relates in general to a gate driver for the devices connected to the non-reference DC rail in a power converter and more specifically to driving devices exhibiting a high impedance control input without a floating power source.

Power converters are known in the art for a wide variety of uses, including power supplies for arc lamps. In a half-bridge converter, a single leg comprising a series-connected pair of switching devices is connected across a DC supply voltage, the output of the leg being the junction between the switching devices. In a full bridge converter, two legs are connected in parallel, the output of the converter being taken between the outputs of the two legs to supply an AC voltage. Multiphase AC voltages may be provided by connecting additional legs.

A problem associated with the design of DC to AC converters relates to the switching of the upper devices, i.e. the devices connected to the non-reference DC rail (usually the positive rail), which are not connected to circuit common. In conventional converters with bipolar transistors used as the switching devices, the drive voltage for the upper devices must exceed the main DC supply voltage since a continuous current must be supplied to the base of each device while it is turned on. In other words, since the voltage between the base and the negative electrode of a bipolar transistor is typically much greater than the voltage between the positive and negative electrodes when the transistor is on, the drive voltage between the transistor gate and circuit common, for an upper device, must be greater than the DC supply voltage. The excess voltage is typically supplied by a separate, floating power supply. The special level shifting circuitry required to drive the upper devices complicates the converter, with a consequent increase in the cost of the circuit.

Other switching devices exhibiting a high impedance control input, such as field-effect transistors (FETs) and insulated-gate transistors (IGTs), have also been used in converters. These devices can be turned on by application of a voltage signal to the control input, rather than a current signal as required by bipolar transistors. U.S. Pat. No. 4,485,434, issued to Beeston et al. on Nov. 27, 1984, shows a full bridge converter using FETs and supplying an arc lamp, but also requires a transformer with four separate secondary windings and four separate voltage regulators for driving the FETs.

Accordingly, it is a principal object of the present invention to provide a driver circuit for the upper device in a converter leg which eliminates the need for a separate floating power source for the driver circuit.

It is another object of the present invention to provide a DC to AC converter specially adapted to operate an arc discharge lamp.

SUMMARY OF THE INVENTION

These and other objects are achieved in a DC to AC converter adapted to be connected to a DC supply for providing a DC voltage between a reference rail and a non-reference rail, the converter comprising a current-limiting impedance, a converter leg and an upper device gating means. The current-limiting impedance has one end adapted to be connected to one of the rails of the DC supply. The converter leg is connected to the other side of the impedance and is adapted to be connected to the other of the rails of the DC supply. The leg is comprised of a series-connected pair of upper and lower semiconductor switching devices, the upper device being connected to the non-reference rail of the DC supply. The upper device has a high impedance control input and exhibits a capacitance between its control input and its negative electrode. The upper device gating means is coupled to the upper device and is adapted to be connected to the reference rail. The upper device gating means is adapted to selectively charge the capacitance while the lower device is conducting, to bring the upper device into conduction, and is adapted to selectively discharge the capacitance while the lower device is conducting to drive the upper device out of conduction.

BRIEF DESCRIPTION OF THE DRAWINGS

The novel features of the invention are set forth with particularity in the appended claims. The invention itself, however, as to organization and method of operation, together with further objects and advantages thereof, may best be understood by reference to the following description taken in conjunction with the accompanying drawings in which:

DETAILED DESCRIPTION OF THE INVENTION

Figure 1:
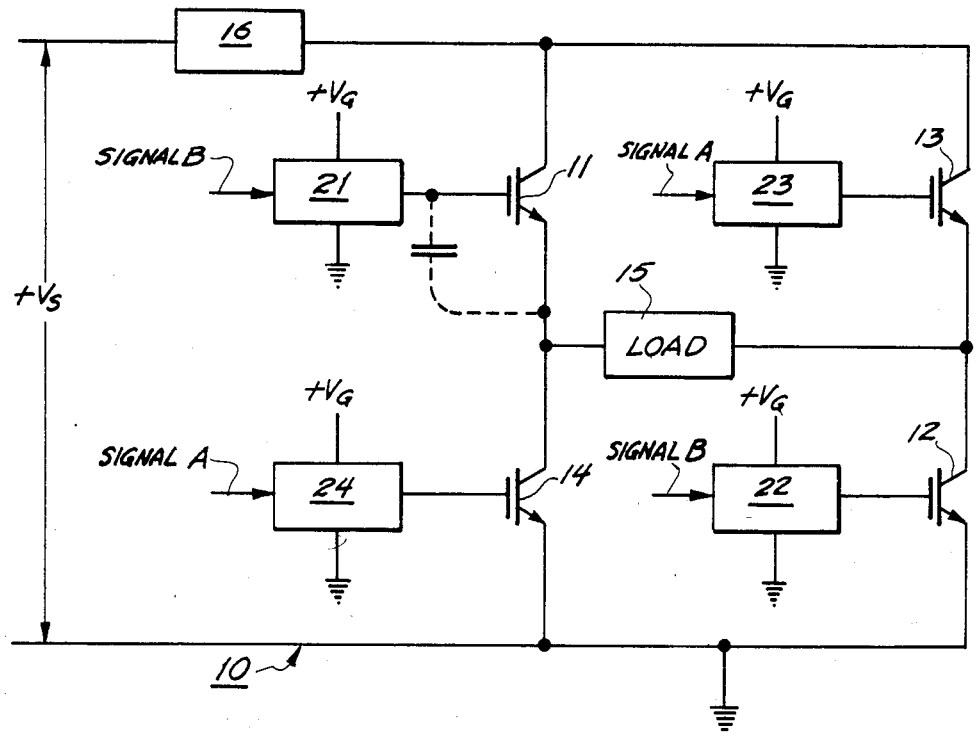
FIG. 1 is a part schematic and part block diagram of a full-bridge converter with the gate driving circuits of the invention.

Referring to FIG. 1, a DC to AC converter 10 is seen to receive a DC voltage $V_S$. A full bridge is formed by semiconductor switching devices 11–14. Devices 11 and 14 comprise a converter leg with device 11 being the upper device and device 14 being the lower device of the leg. Devices 13 and 12 are similarly connected in the other converter leg. As is well known, an alternating current may be supplied to a load 15 connected between the outputs of the converter legs by turning on devices 11 and 12 alternately with devices 13 and 14. Driver devices 21–24 are each connected to a DC voltage $V_G$ and to devices 11–14, respectively, for controlling the switching of devices 11–14 in response to a pair of control signals A and B. For example, a high level of control signal B would turn on devices 11 and 12 while a low level of signal B would turn off devices 11 and 12. Control signals A and B may be obtained according to many methods known in the art.

According to the present invention, switching devices 11–14 are semiconductor devices which exhibit a high impedance control input and, consequently, exhibit an inherent capacitance between the gate and the negative electrode (source or emitter) of the device, as shown connected by the dashed conductor to device 11. Devices 11–14 are shown in FIG. 1 as insulated-gate transistors (IGTs), available from General Electric Company, Semiconductor Business Division, Syracuse, New York, although other devices such as metal-oxide-silicon field-effect transistors (MOSFETs) could also be used.

Figure 2:
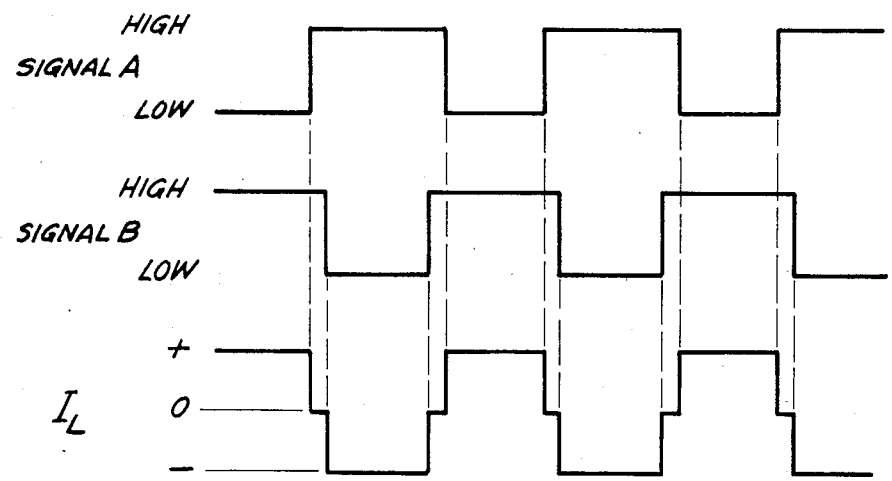
FIG. 2 is a timing diagram which illustrates the operation of the converter of FIG. 1.

Due to the operation of driver circuits 21 and 23 for upper IGTs 11 and 13, all of IGTs 11–14 are simultaneously turned on between alternate switchings of the full bridge, i.e. control signals A and B are high simultaneously for a short period between the times that they are inverted. Therefore, a current-limiting impedance 16 is connected in series with the converter legs to protect IGTs 11–14 during the times that they are all on and during any times that the load impedance is too low to provide current-limiting. A timing diagram of control signals A and B in FIG. 2 demonstrates the conduction overlaps of the upper and lower devices of each leg between alternate switchings of the bridge. Control signals A and B may be derived, for example, from the outputs of a JK flip-flop with conduction overlaps being provided by an electronic timing circuit. Load current $I_L$, also shown in FIG. 2, is an alternating current and is zero when IGTs 11–14 are all conducting.

Referring again to FIG. 1, it is seen that driver circuits 21–24 are supplied with a DV voltage $V_G$ which is referenced to ground and which is no greater than $V_S$. Upper devices 11 and 13 can thus be driven without any floating power sources. While driver circuits 21–24 are shown to be referenced to the negative DC rail (i.e. ground) it will be understood that they could also be referenced to the positive DC rail if the appropriate type of semiconductor devices were used. Each of the driver circuits is arranged so as to charge its respective gate capacitance when its respective control signal is high and to discharge its respective gate capacitance when its respective control signal is low. The charging and discharging of the gate capacitances of the upper devices is accomplished without a floating source greater than $V_S$ by switching them only when the lower devices are conducting. The driver circuits for the lower devices, i.e. driver circuits 22 and 24, may be configured according to the prior art or may even be implemented according to the present invention as will now be described.

Figure 3:
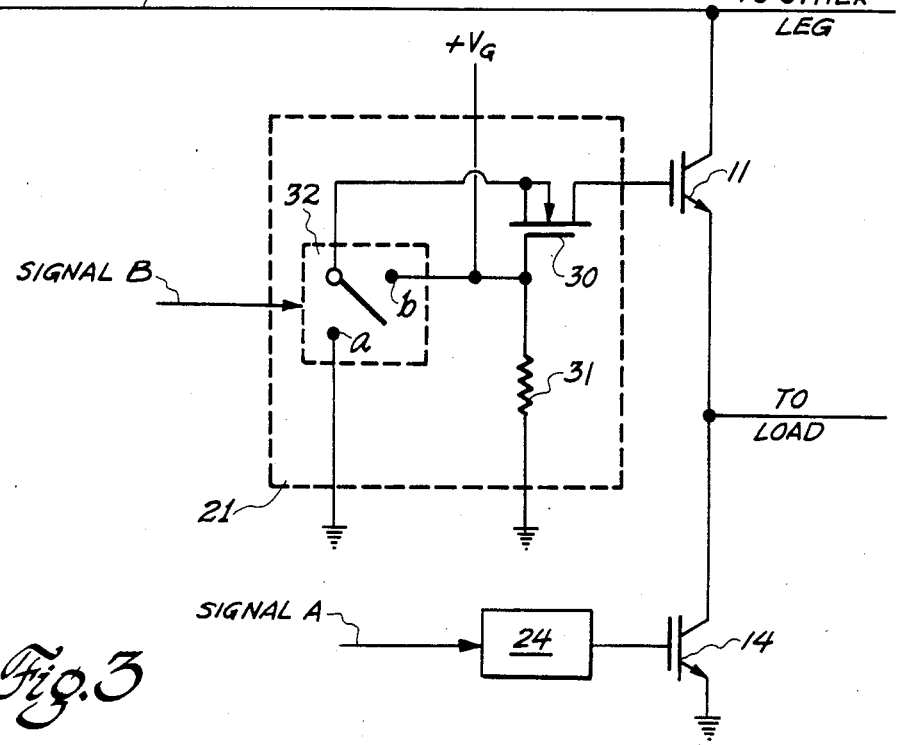
FIG. 3 is a schematic diagram of a gate driver circuit according to the present invention.

One embodiment of gate driver 21 for an upper device, i.e. IGT 11, is illustrated in FIG. 3. An n-channel enhancement mode MOSFET 30 is connected between the gate of IGT 11 and a switch 32. Switch 32 connects IGT 11 to $+V_G$ through switch position b and to circuit common through switch position a depending on the high or low level of control signal B. Switch 32, though illustrated for ease of understanding as a single-pole, double-throw switch, typically comprises an electronic switch. The gate of MOSFET 30 is connected directly to $+V_G$ and is connected to circuit common through a resistor 31.

In operation, gate driver 21 switches IGT 11 only if IGT 14 is conducting. Assume that IGT 14 is nearing the end of its conduction period. When control signal B goes high, switch 32 is changed from position a to position b. In this configuration, MOSFET 30 acts as a forward-biased diode and current flows from $+V_G$ through MOSFET 30 to charge the gate capacitance of IGT 11 and IGT 11 turns on. When IGT 14 turns off due to signal A going low, IGT 11 continues to conduct because of the charge on its gate capacitance. Switch 32 remains in position b throughout the conduction period of IGT 11.

At the conclusion of the conduction period of IGT 11, lower IGT 14 is turned on and switch 32 is placed in position a. This provides gate bias for MOSFET 30 which turns on, discharging the gate capacitance of IGT 11. This completes one cycle of the converter leg. It should be noted that the conduction overlap times of IGT 11 and IGT 14, when the upper device is turned on and when the upper device is turned off, are not necessarily equal in duration, but may be adjusted to optimize performance.

Figure 4:
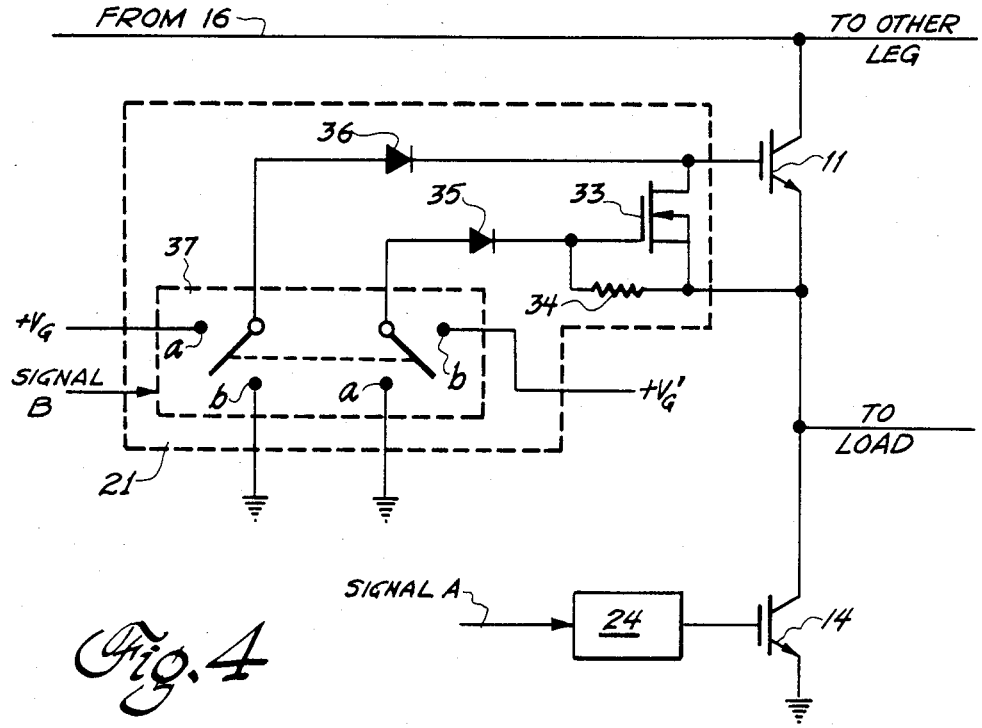
FIG. 4 is a schematic diagram of the preferred embodiment for a single gate drive circuit.
Figure 5:
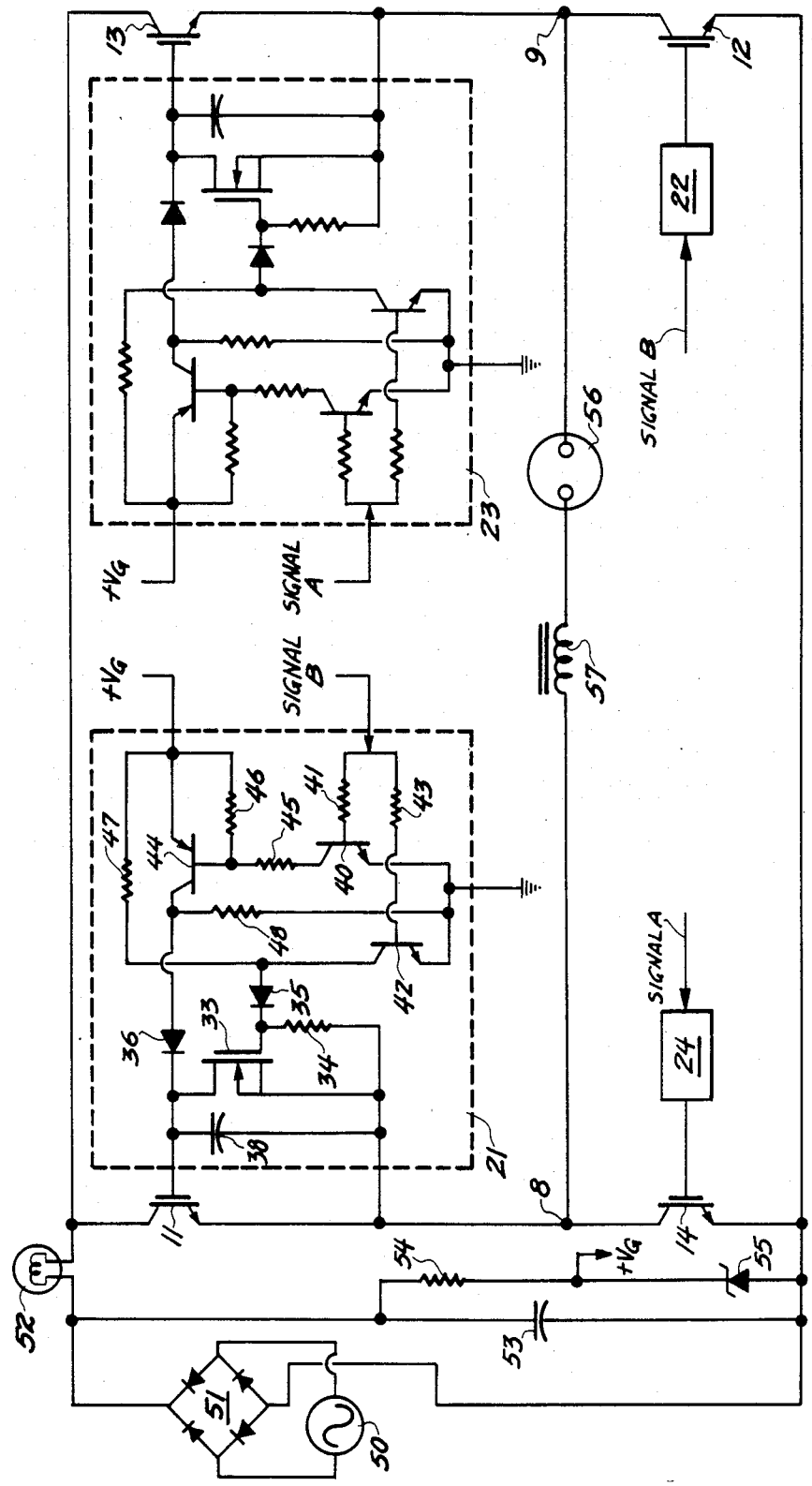
FIG. 5 is a schematic diagram of a lighting system according to the invention.

The preferred embodiment of gate driver 21 is shown schematically in FIG. 4. A MOSFET 33 is connected between the gate and the negative electrode of IGT 11. A resistor 34 couples the gate of MOSFET 33 with the negative electrode of MOSFET 33. A diode 35 couples a switch 37 to the gate of MOSFET 33, while a diode 36 couples switch 37 to the gate of IGT 11. Switch 37 is illustrated as a double-pole double-throw switch which receives control signal B and which may also be implemented electronically, as shown in FIG. 5. With switch 37 in position a, the anode of diode 35 is connected to ground and the anode of diode 36 is connected to $+V_G$. In position b, the anode of diode 36 is connected to ground and the anode of diode 35 is connected to $+V_G'$ which may or may not be equal to $+V_G$.

To illustrate the operation of the circuit of FIG. 4, assume that IGT 14 is nearing the end of its conduction period. When control signal B goes high, switch 37 is placed in position a and the gate capacitance of IGT 11 is charged through diode 36. When IGT 14 turns off, IGT 11 becomes isolated and is, therefore, latched for the duration of its conduction interval. After IGT 14 is again turned on by control signal A, IGT 11 may be turned off. When control signal B goes low, switch 37 is placed in position b causing the gate charge on IGT 11 to discharge through MOSFET 33, thus completing a cycle.

An embodiment of the present invention, specially adapted to operate an arc discharge lamp is shown in FIG. 5. An AC voltage from a source 50, typically a 50 or 60 hertz power line, is full-wave rectified by a diode bridge 51 and the rectified voltage is smoothed by a capacitor 53 to provide a DC voltage. IGTs 11–14 are coupled across the DC rails as previously described. An incandescent filament 52 is connected in series with the converter to provide both current-limiting and light output. An arc lamp 56 is coupled between the output terminals 8 and 9 of the converter and is the primary light source of the lighting system. A reactor 57 may also be connected in series with arc lamp 56 to provide additional current-limiting.

In the lighting system of FIG. 5, gate drivers 21–24 are implemented according to the embodiment of FIG. 4. Thus, only gate driver 21 will be described since the construction and operation of the other gate drivers are identical.

DC voltage $+V_G$, for operating gate drivers 21–24, is obtained from the series-connected resistor 54 and zener diode 55, coupled across capacitor 53. The voltage $+V_G$ is regulated by zener diode 55 and is provided to each gate driver. Each gate driver is also provided with control signals A and B as previously described.

Gate driver 21 includes MOSFET 33, resistor 34 and diodes 35 and 36 which were described with reference to FIG. 4. FIG. 5 additionally shows electronic switch circuitry for implementing switch 37. The collector of a pnp transistor 44 is connected to the anode of diode 36 and is coupled to ground through a resistor 48. The emitter of transistor 44 is connected to $+V_G$ and to a resistor 46. The base of transistor 44 is connected to the junction between resistor 46 and a resistor 45. Resistor 45 is connected to the collector of a transistor 40. The emitter of transistor 40 is connected to ground and the base of transistor 40 receives control signal B through a resistor 41. A transistor 42 receives control signal B through a resistor 43 connected to its base. The emitter of transistor 42 is connected to ground and the collector of transistor 42 is connected to the anode of diode 35. The anode of diode 35 is coupled to $V_G$ through a resistor 47.

The electronic switching means supplies current for turning on diodes 35 and 36 and for charging and discharging the capacitance. Thus, control signal B is provided to transistors 40 and 42 through resistors 41 and 43, respectively. Transistor 42 is coupled to $+V_G$ through a resistor 47. Thus, when control signal B is low, transistor 42 is off and diode 35 is turned on by current from resistor 47. This discharges the gate capacitance of IGT 11 as previously described. When control signal B is high, the anode of diode 35 is grounded through transistor 42, latching the gate of IGT 11, and transistor 40 is also turned on. Transistor 44 then turns on as a result of the voltage supplied to its base from a voltage divider formed by resistors 45 and 46. Diode 36 and a resistor 48 are connected to the output of transistor 44. With transistor 44 turned on, diode 36 charges the gate capacitance of IGT 11. When control signal B goes low, both transistors 40 and 44 turn off, preventing any further charge on the gate capacitance.

In the embodiment of FIG. 5, the gate capacitance of IGT 11 is augmented with an external capacitor 38. The optional capacitor allows for circuit optimization.

The foregoing discloses a driver circuit for the upper device in a converter leg which eliminates the need for a separate floating power source for the driver circuit, wherein the upper device exhibits a high impedance control input. A particular application of the invention to the operation of an arc discharge lamp was shown.

While preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

What is claimed is:

1. A DC to AC converter adapted to be connected to a DC supply for providing a DV voltage between a reference rail and a non-reference rail, said converter comprising:
    a current-limiting impedance having one end adapted to be connected to one of said rails;
    a first converter leg connected to the other end of said impedance and adapted to be connected to the other of said rails, said first leg being comprised of a series-connected pair of upper and lower semiconductor switching devices forming a first junction therebetween, said upper device adapted to be connected to said non-reference rail of said DC supply and said lower device adapted to be connected to said reference rail of said DC supply, said upper and lower devices having a respective high impedance control input and exhibiting a respective capacitance between its respective control input and its respective negative electrode;
    an upper device gating means coupled to said upper device and adapted to be connected to said reference rail, said upper device gating means adapted to selectively charge said capacitance of said upper device while said lower device is conducting to bring said upper device into conduction and adapted to selectively discharge said capacitance of said upper device while said lower device is conducting to drive said upper device out of conduction;
    a lower device gating means coupled to said lower device and adapted to be connected to said reference rail, said lower device gating means adapted to selectively charge said capacitance of said lower device while said upper device is conducting to bring said lower device into conduction and adapted to selectively discharge said capacitance of said lower device while said upper device is conducting to drive said lower device out of conduction;
    a second converter leg connected to said other end of said impedance and adapted to be connected to said other of said rails, said second leg being comprised of a series connected pair of circuit elements forming a second junction therebetween;
    said first and second junctions adapted to be connected to either end of a load, respectively; and
    power supply means for supplying a DC voltage to said upper device gating means, said power supply means comprising:
    resistance means adapted to be coupled to one side of said power supply means,
        voltage regulator means connected in series with said resistance means at a third junction and adapted to be coupled to the other side of said power supply means, and
        means coupling said third junction to said upper device gating means.

2. The DC to AC converter of claim 1 wherein said upper device and said lower device each comprise an insulated-gate transistor, respectively.

3. The DC to AC converter of claim 1 wherein said voltage regulator means comprises a zener diode, said power supply means further including capacitance means coupled in parallel across the series combination of said resistance means and said zener diode.

4. The DC to AC converter of claim 1 wherein said upper device gating means comprises:
    a semiconductor gating switch coupled between the control input and the negative electrode of said upper device;
    a resistor coupling the gate of said gating switch to the negative electrode of said gating switch;
    a first diode having its cathode connected to the control input of said upper device;
    a second diode having its cathode connected to the gate of said gating switch; and
    electronic switching means connected to the anodes of said first and second diodes and adapted to be connected to said reference rail, said electronic switching means selectively forward biasing said first diode to bring said upper device into conduction and selectively forward biasing said second diode to drive said upper device out of conduction in response to a control signal.

5. The DC to AC converter to claim 4 wherein said upper device gating means further comprises a capacitor connected between the control input and the negative electrode of said upper device.

6. A lighting system comprising:

a rectifier adapted to receive an AC voltage across its inputs, said rectifier providing a DC voltage between a reference rail and a non-reference rail;

a current-limiting impedance having one end connected to one of said rails;

two converter legs, each of said legs connected between the other end of said impedance and the other one of said rails, each of said legs being comprised of a series-connected pair of upper and lower semiconductor switching devices defining a junction therebetween, the upper device of each of said legs being connected to said non-reference rail, said upper device having a high impedance control input and exhibiting a capacitance between its control input and its negative electrode;

an arc lamp coupled between said junctions of said two converter legs;

two lower device gating means, each of said lower device gating means connected between a respective lower device and said reference rail, for selectively bringing each said respective lower device into and out of conduction; and two upper device gating means, each of said upper device gating means connected between a respective upper device and said reference rail, each of said upper device gating means selectively charging the capacitance of said respective upper device while the respective lower device connected thereto is conducting to bring said respective upper device into conduction and selectively discharging the capacitance of said respective upper device while the respective lower device connected thereto is conducting to drive said respective upper device out of conduction.

7. The lighting system of claim 6 wherein each of said upper device gating means comprises:

a semiconductor gating switch coupled between the control input and the negative electrode of said respective upper device;

a resistor coupling the gate of said gating switch to the negative electrode of said gating switch;

a first diode having its cathode connected to the control input of said respective upper device;

a second diode having its cathode connected to the gate of said gating switch; and electronic switching means connected to the anodes of said first and second diodes and to said reference rail, said electronic switching means selectively forward biasing said first diode to bring said respective upper device into conduction and selectively forward biasing said second diode to drive said respective upper device out of conduction in response to a control signal.

8. The lighting signal of claim 6 wherein said current-limiting impedance comprises an incandescent filament.

9. The lighting system of claim 7 wherein each of said upper device gating means further comprises a capacitor connected between the control input and the negative electrode of the respective upper device.

* * * * *